United States Patent [19]

Nakayama et al.

[11] Patent Number: 5,595,805

[45] Date of Patent: Jan. 21, 1997

[54] MAGNETO-OPTICAL RECORDING MEDIUM

[75] Inventors: Junichiro Nakayama, Shiki-gun; Junsaku Nakajima, Yamatotakada; Akira Takahashi, Nara; Kenji Ohta, Kitakatsuragi-gun, all of Japan

[73] Assignee: Sharp Kabushiki Kaisha, Osaka, Japan

[21] Appl. No.: 318,536

[22] Filed: Oct. 5, 1994

Related U.S. Application Data

[63] Continuation of Ser. No. 910,678, Jul. 8, 1992, abandoned.

[30] Foreign Application Priority Data

Jul. 8, 1991 [JP] Japan ................... 3-167201

[51] Int. Cl.$^6$ ................................. G11B 5/66
[52] U.S. Cl. .................. 428/64.3; 428/694 ML; 428/694 SC; 428/694 LE; 428/694 DE; 428/694 RL; 428/900
[58] Field of Search .............. 428/694 ML, 694 SC, 428/694 LE, 694 DE, 694 RL, 64.3, 900

[56] References Cited

U.S. PATENT DOCUMENTS

| 4,610,912 | 9/1986 | Takahashi | 428/213 |
| 4,670,353 | 6/1987 | Sakurai | 428/606 |

FOREIGN PATENT DOCUMENTS

| 258978 | 3/1988 | European Pat. Off. . |
| 0336237A3 | 10/1989 | European Pat. Off. . |
| 0352548A3 | 1/1990 | European Pat. Off. . |
| 0387420A2 | 9/1990 | European Pat. Off. . |
| 73746 | 5/1983 | Japan . |
| 165306 | 9/1983 | Japan . |
| 113162 | 6/1984 | Japan . |
| 201247 | 11/1984 | Japan . |
| 60-70542 | 4/1985 | Japan . |
| 63-14343 | 1/1988 | Japan . |
| 2071696 | 9/1981 | United Kingdom . |

OTHER PUBLICATIONS

"Read Out Mechanism Of Magnetically Induced Super Resolution" (Proceedings of Magneto–Optical Recording International Symposium 1991, J. Magn. Soc. Jpn., vol. 15, Supplement No. sl (1991, pp. 319–322.

*Primary Examiner*—Leszek Kiliman
*Attorney, Agent, or Firm*—David G. Conlin; Milton Oliver

[57] ABSTRACT

A magneto-optical medium has a substrate through which a light beam is transmitted and a recording-reproduction layer. The recording-reproduction layer, which exhibits an in-plane magnetization characteristic at the first temperature while still containing magnetization components in the perpendicular direction corresponding to information, comes to exhibit a perpendicular magnetization characteristic above the second temperature higher than the first temperature. In this magneto-optical recording medium, information is reproduced by utilizing a temperature distribution of the recording-reproduction layer being subjected to irradiation of a light beam and by raising the temperature of a portion within a light spot of the light beam from the first temperature to the second temperature.

8 Claims, 3 Drawing Sheets

← DISK SHIFT DIRECTION

MAGNETO-OPTICAL RECORDING MEDIUM

This is a Continuation of application Ser. No. 07/910,678 filed Jul. 8, 1992, now abandoned.

FIELD OF THE INVENTION

The present invention relates to a magneto-optical recording medium, such as a magneto-optical disk, a magneto-optical tape or a magneto-optical card, for use in magneto-optical recording apparatuses.

BACKGROUND OF THE INVENTION

In a magneto-optical recording medium such as a magneto-optical disk, the diameter of a light spot formed on the recording medium by a light beam for use in recording and reproduction is the same as that of a recorded bit; therefore, its recording density is restricted by the diameter of the light spot. Recently, however, in order to increase the recording density of an optical memory device, a magneto-optical recording medium has been proposed for reproducing recorded bits with diameters smaller than the diameter of a light spot.

Normally, the light beam for use in optical recording and reproduction is converged to a diffraction limit by a converging lens; therefore, the light intensity distribution shows a Gaussian distribution, and thus the temperature distribution on the recording medium also exhibits a virtual Gaussian distribution. As a result, a spot having a temperature that is not less than a predetermined temperature become smaller in size than the size of the light spot. Consequently, the recording density can be greatly improved if only the spot having a temperature not less than the predetermined temperature is utilized for reproduction.

Referring to FIG. 6, the following description will discuss a magneto-optical disk magneto-optical recording medium) wherein a recorded bit with a size smaller than the size of a light spot can be reproduced. The magneto-optical disk is mainly constituted by a readout layer 6 and a recording layer 7 that are formed on one surface of a substrate 5. The recording layer 7 has a great coercive force at room temperature. On the contrary, the readout layer 6 has a small coercive force at room temperature. When the temperature of an area of the readout layer 6 to be reproduced is raised, the direction of magnetization thereon becomes coincident with the direction of magnetization of the recording layer 7 due to the effect of the recording layer 7. That is, the magnetization of the recording layer 7 is copied onto the readout layer 6 by an exchange coupling force between the readout layer 6 and the recording layer 7.

In the above arrangement, information is recorded onto the magneto-optical disk by the ordinary photo-thermomagnetic recording method. When information is reproduced from the magneto-optical disk, it is necessary to make the direction of magnetization of the readout layer 6 coincident with a predetermined direction upward in FIG. 6) by applying an auxiliary magnetic field from an auxiliary magnetic field generating device 10 (Initialization). Then, a reproduction-use light beam 9 is projected onto the magneto-optical disk through a converging lens 8. Thus, the temperature of the readout layer 6 is locally raised at a center portion of a light spot and the magnetized information on the recording layer 7 is copied onto the readout layer 6. Thus, in this magneto-optical disk, only the information located at an area within the center portion of the light spot which has been irradiated by the reproduction-use light beam 9 and undergone a temperature rise above a predetermined temperature, is reproduced. Accordingly, recorded bits with a diameter smaller than that of the light spot of the reproduction-use light beam 9 are permitted to be read out.

However, in the above-mentioned conventional magneto-optical recording medium, prior to a reproducing operation, an auxiliary magnetic field needs to be applied from the auxiliary magnetic field generating device 10 for the purpose of initialization.

Further, a recorded bit on the readout layer 6 having the magnetized information which has been copied from the recording layer 7 in the reproducing operation remains as it is even after the reproducing operation has finished and the temperature has dropped. For this reason, when the irradiated area of the reproduction-use light beam 9 is shifted so as to reproduce the next recorded bit, the recorded bit having the residual magnetized information previously copied still exists within the light spot of the reproduction-use light beam 9, and this recorded bit having the residual magnetized information, which has been already reproduced, tends to be reproduced together with a signal from an aimed recorded bit during reproduction. This results in noise and thereby presents a problem in improving the recording density.

Furthermore, in the conventional magneto-optical recording medium, at least two types of magnetic layers, that is, the readout layer 6 and the recording layer 7, are required; this necessitates a complicated manufacturing process.

SUMMARY OF THE INVENTION

It is an object of the present invention to provide a magneto-optical recording medium wherein: no auxiliary magnetic field is necessary during reproduction; no residual magnetized information exists in a recorded bit which has already been reproduced; and reproduction is executed by using only one type of magnetic layer such that the manufacturing process can be simplified.

In order to achieve the above objective, a magneto-optical recording medium of the present invention has a substrate through which a light beam is transmitted and a recording-reproduction layer, formed on the substrate, which exhibits in-plane magnetization characteristic at the first temperature while still having magnetization components in the perpendicular direction that correspond to information and further exhibits the perpendicular magnetization characteristic above the second temperature that is higher than the first temperature. This arrangement is characterized in that information is reproduced by utilizing a temperature distribution on the recording-reproduction layer being subjected to the light beam and by raising the temperature of a portion within a light spot of the light beam from the first temperature above the second temperature.

With the above arrangement, the recording density of the magneto-optical recording medium is determined not by the size of the light spot of the light beam but by the temperature distribution; therefore, a recorded bit whose diameter is smaller than that of the light spot can be reproduced. Thus, the recording density of the magneto-optical recording medium can be greatly improved.

When a light beam is applied onto the recording-reproduction layer with recorded information during reproduction, the recording-reproduction layer being subjected to the light beam and a temperature rise has a temperature distribution wherein a portion within the light spot has a temperature rise above the second temperature. Thus, a transition from the in-plane magnetization characteristic to the perpendicular magnetization characteristic occurs in the portion within the light spot having the temperature rise above the second temperature and the portion exhibits the perpendicular magnetization characteristic in accordance with components of the perpendicular direction that have been maintained during the state of in-plane magnetization. As a result, only the portion of the magneto-optical recording medium comes to exhibit the magneto-optical effect and, according to reflected light from this portion, information in recorded bits on the recording-reproduction layer can be reproduced.

By the time the light beam is shifted so as to reproduce the next recorded bit, the temperature of the recorded bit subjected to the previous reproduction has dropped below the second temperature such that a transition from the perpendicular magnetization characteristic to the in-plane magnetization characteristic has occurred and this recorded bit no longer shows the magneto-optical effect. Thus, in the magneto-optical recording medium, interference by signals from the adjoining bits, which causes noise, can be eliminated; therefore, a recorded bit whose diameter is smaller than that of a light spot can be reproduced. As a result, the recording density of the magneto-optical recording medium can be greatly improved.

Moreover, since the magneto-optical recording medium is provided with only one recording-reproduction layer for recording and reproducing information, the manufacturing process can be simplified and, by making the recording-reproduction layer thinner, a reflective layer, which has been conventionally employed, can be incorporated into the arrangement. Therefore, the magneto-optical recording medium has effects in improving the quality of reproduced signals and in reducing the material costs.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory drawing showing an arrangement of a magneto-optical recording medium.

FIG. 2 is a drawing showing magnetic condition of a rare-earth-transition-metal alloy that is employed in a magnetic layer.

FIG. 3 is an explanatory drawing that indicates the relationship between the externally-applied magnetic field to be applied onto the magnetic layer and the magnetic Kerr rotation angle.

FIG. 4 is an explanatory drawing that indicates the relationship between the externally-applied magnetic field to be applied onto the magnetic layer and the magnetic Kerr rotation angle, from temperature $T_1$ to temperature $T_2$.

FIG. 5 is an explanatory drawing showing another arrangement of a magneto-optical recording medium.

DESCRIPTION OF THE EMBODIMENTS

Referring to FIGS. 1 through 5, the following description will discuss one embodiment of the present invention.

Figure 1:
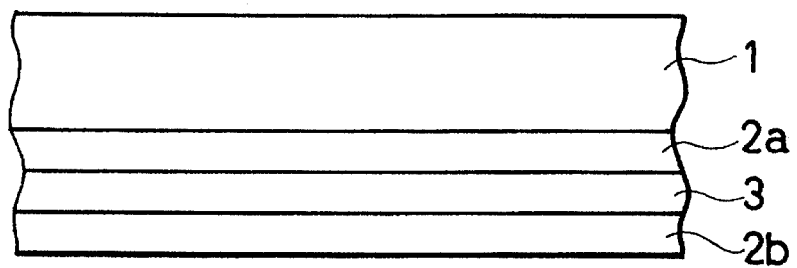
FIGS. 1 through 5 show one embodiment of the present invention.

As shown in FIG. 1, a magneto-optical disk (magneto-optical recording medium) of the present invention is constituted of a substrate 1 through which a reproduction-use light beam is transmitted and a recording-reproduction layer onto which the reproduction-use light beam that has been transmitted through the substrate 1 is directed. The recording-reproduction layer has a three-layer structure including one transparent dielectric film 2a, a magnetic layer 3 and the other transparent dielectric film 2b that are laminated on the substrate 1 in this order.

A reproduction-use light beam that has been converged by a converging lens (not shown) is projected onto the magneto-optical disk. This reproduction-use light beam has been converged to a diffraction limit by the converging lens such that the light intensity distribution of the reproduction-use light beam shows a Gaussian distribution. Consequently, the reproduction-use light beam having the Gaussian distribution makes the temperature distribution of the magnetic layer 3 virtually coincident with the Gaussian distribution; therefore, the temperature of a smaller portion within a light spot is raised above the second temperature. Here, as will be described later, the second temperature is a temperature at which a transition from the in-plane magnetization characteristic to the perpendicular magnetization characteristic occurs in the magnetic layer 3.

Figure 2:
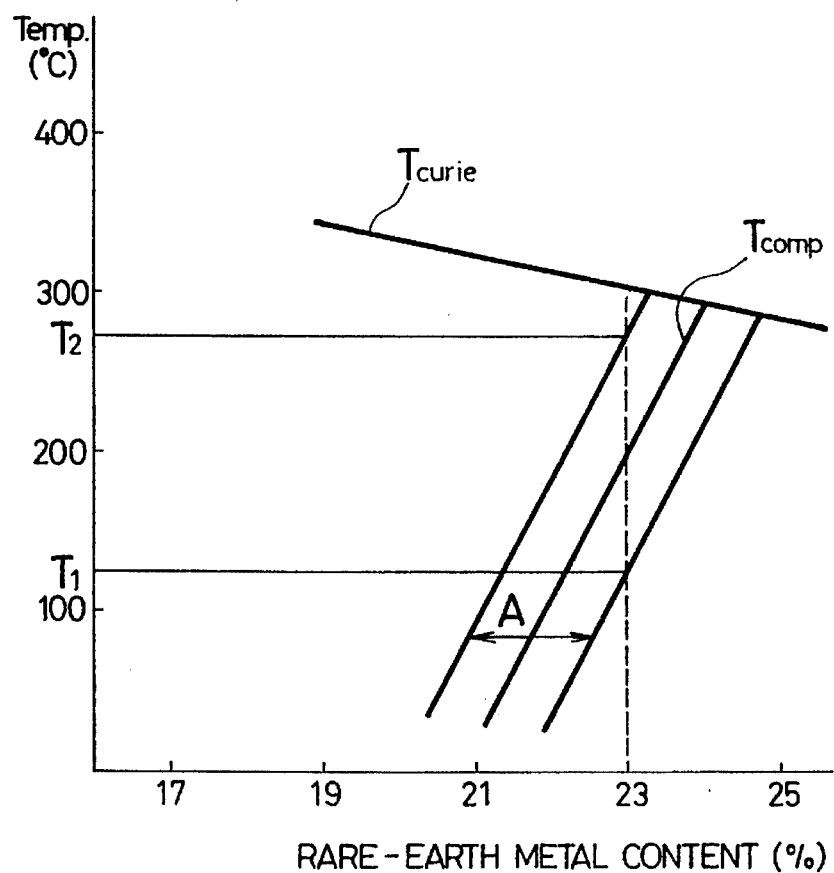

The magnetic layer 3 is made up of a rare-earth-transition-metal alloy which has a characteristic shown in the drawing of the magnetic state in FIG. 2. More specifically, the rare-earth-transition-metal alloy has a characteristic wherein the perpendicular magnetization characteristic appears in the vicinity of the compensating composition (Tcomp)(a range indicated by A) at which the magnetic moments of the rare-earth metal and the transition-metal balance each other while the in-plane magnetization characteristic appears within a range below the Curie temperature (except the area A).

The above-mentioned rare-earth-transition-metal alloy has a composition which contains more rare-earth metal than the compensating composition at room temperature (the first temperature). (For example, the composition is indicated by a dotted line in FIG. 2). This is because the magnetic moments of the rare-earth metal and the transition metal are respectively different from each other in their temperature characteristics; i.e., at high temperatures the magnetic moment of the transition metal is greater than that of the rare-earth metal. Consequently, the magnetic layer 3, which is made up of the rare-earth-transition-metal alloy having this composition, exhibits not the perpendicular magnetization characteristic but the in-plane magnetization characteristic at room temperature (the first temperature). On the other hand, as the temperature of the magnetic layer 3 rises, the magnetic moment of the transition metal becomes relatively greater until it balances the magnetic moment of the rare-earth metal, and when the temperature further rises above the second temperature, a transition occurs from the in-plane magnetization characteristic to the perpendicular magnetization characteristic.

In this case, the above-mentioned rare-earth-transition-metal alloy not only has magnetization components in in-plane directions but has a few magnetic components in the perpendicular direction even in the state of the in-plane magnetization at room temperature (the first temperature). Here, the magnetization components in the perpendicular direction correspond to information that has been preliminarily recorded. Therefore, when the transition from the in-plane magnetization characteristic to the perpendicular magnetization characteristic occurs due to the temperature rise on the rare-earth-transition-metal alloy, the magnetization components in in-plane directions are brought to the perpendicular direction in accordance with the perpendicular direction of the magnetization components that have been maintained during the state of in-plane magnetization.

When a reproducing operation is executed with respect to the magneto-optical disk having the above arrangement, a reproduction-use light beam is projected onto the magnetic layer 3 from the side of the substrate 1. At this time, a recorded bit in the magnetic layer 3 to be reproduced virtually exhibits the in-plane magnetization characteristic since it is at room temperature (the first temperature). Accordingly, since this recorded bit has only a few magnetization components in the perpendicular magnetization characteristic direction, the magneto-optical effect of the reproduction-use light beam is small.

The recorded bit located at the center portion of the light spot undergoes a transition from the in-plane magnetization characteristic to the perpendicular magnetization characteristic due to a temperature rise that has been caused by the irradiation of the reproduction-use light beam having a light intensity with a Gaussian distribution. In this case, it is desirable for the reproduction-use light beam to have a Gaussian distribution; yet, a light beam having a uniform light intensity distribution may be used. This is because irradiation time of the reproduction-use light beam onto the magnetic layer 3 is the longest at the portion that passes through the center of a light spot and thereby the temperature of a recorded bit existing at this portion is raised to the highest.

When the temperature of the recorded bit is raised by the irradiation of the reproduction-use light beam, the magnetization components having in-plane directions are brought to the perpendicular direction in accordance with the residual magnetization components (recorded information) having the perpendicular direction that have been maintained during the state of in-plane magnetization. Accordingly, reflected light derived from the reproduction-use light beam comes to exhibit a greater magneto-optical Kerr effect and, by utilizing this effect, information recorded in the magnetic layer 3 can be reproduced.

Figure 3:
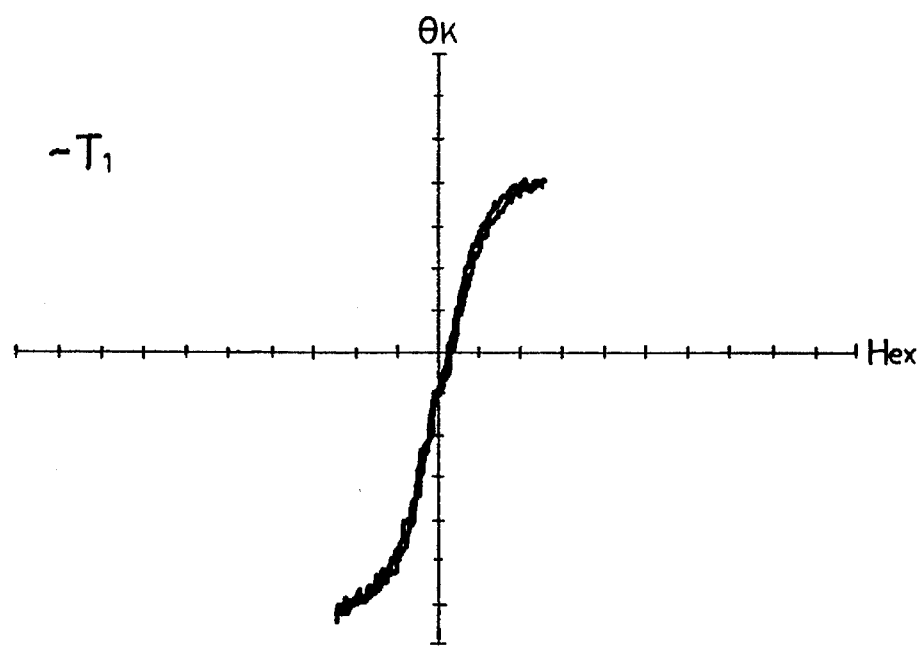
Figure 4:
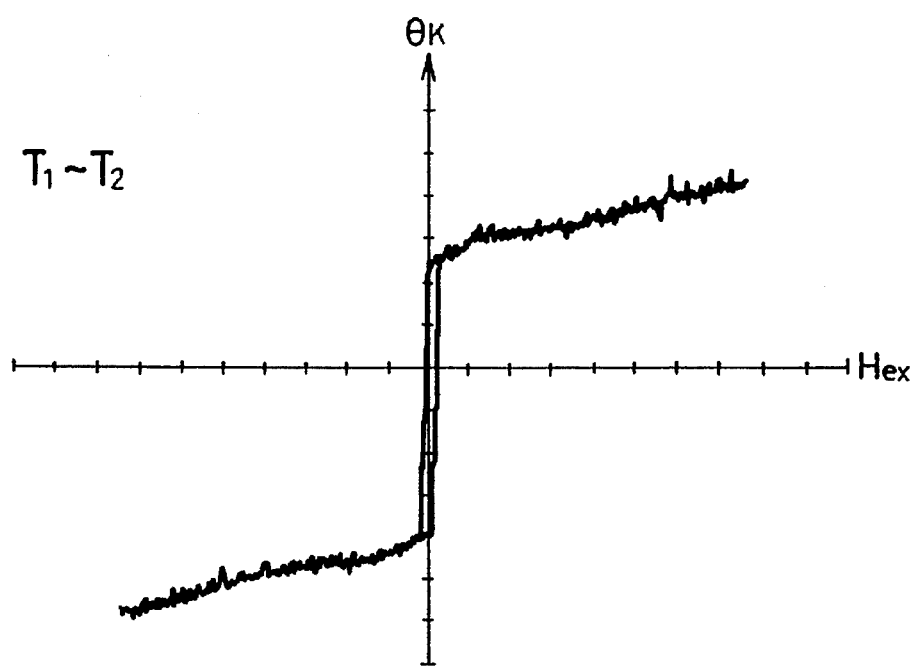

FIGS. 3 and 4 respectively show the relationships between the externally-applied magnetic field $H_{ex}$ that is applied onto the magnetic layer 3 and the magnetic Kerr rotation angle $\theta_K$ (hysteresis characteristics), that is, the magnetic characteristics within respective two temperature ranges: up to temperature $T_1$; and from temperature $T_1$ to temperature $T_2$. Comparisons with these graphs indicate that an abruptly rising hysteresis characteristic appears within the range of the second temperature, from temperature $T_1$ to temperature $T_2$, which suggests that the perpendicular magnetization characteristic is exhibited; therefore, by utilizing the magneto-optical Kerr effect, information is reproduced. Here, in the case of using a rare-earth-transition-metal alloy with a rare-earth metal content of 23%, the above-mentioned temperature $T_1$ is within 150° C. to 250° C. and preferably 200° C., while $T_2$ is within 250° C. to 400° C. and preferably 300° C.

At other portion except the center portion within a light spot on the magneto-optical disk created by the reproduction-use light beam, no transition from the in-plane magnetization characteristic to the perpendicular magnetization characteristic occurs and the magneto-optical Kerr effect hardly appears, because of insufficient temperature rise. Moreover, when the portion to be irradiated by the reproduction-use light beam is shifted so as to reproduce the next recorded bit, the temperature of the already reproduced recorded bit drops below the second temperature since it has been shifted from the center of the light spot; therefore, the magneto-optical Kerr effect no longer appears since the transition from the perpendicular magnetization characteristic to the in-plane magnetization characteristic has taken place. Thus, reproduced information is virtually free from interference by information signals from the bits adjacent to a recorded bit in question, thereby achieving noise reduction.

For example, GdFeCo is employed as a rare-earth-transition-metal alloy for use in the magnetic layer 3. Since this rare-earth-transition-metal alloy has a Curie temperature of not less than 300° C., the intensity of the reproduction-use light beam can be increased. In the present embodiment, a rare-earth-transition-metal alloy of $Gd_{0.23}Fe_{0.64}Co_{0.13}$ was employed as the magnetic layer 3 and its Curie temperature was 300° C. Further, the thickness of the magnetic layer 3 was set to 100 nm.

Besides the above-mentioned rare-earth-transition-metal alloy (GdFeCo), for example, GdTbFe, TbFeCo and DyFeCo may be employed as a rare-earth-transition-metal alloy for use in the magnetic layer 3. In the case of using GdTbFe for the magnetic layer 3, a greater coercive force can be conferred to recorded bits, thereby improving the stability of the recorded bits. In the case of using TbFeCo as the magnetic layer 3, a far greater coercive force can be conferred to recorded bits, thereby further improving the stability of the recorded bits. Moreover, in the case of using DyFeCo as the magnetic layer 3, together with the advantage that a greater coercive force is conferred to recorded bits, another advantage is obtained in that Dy is available more easily at lower costs in comparison with Tb.

Figure 5:
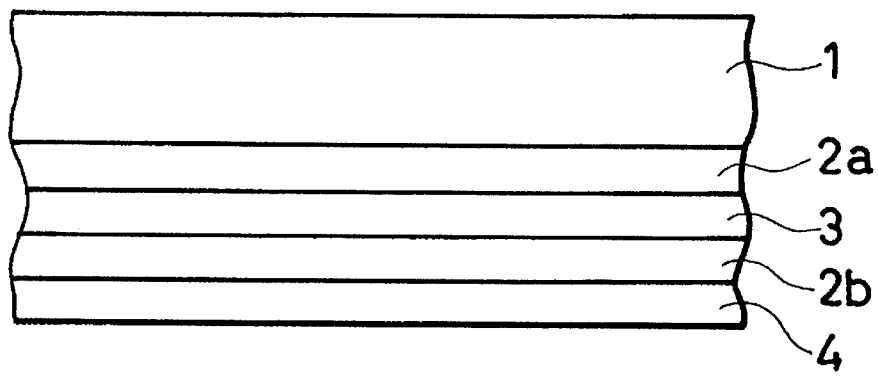
Figure 6:
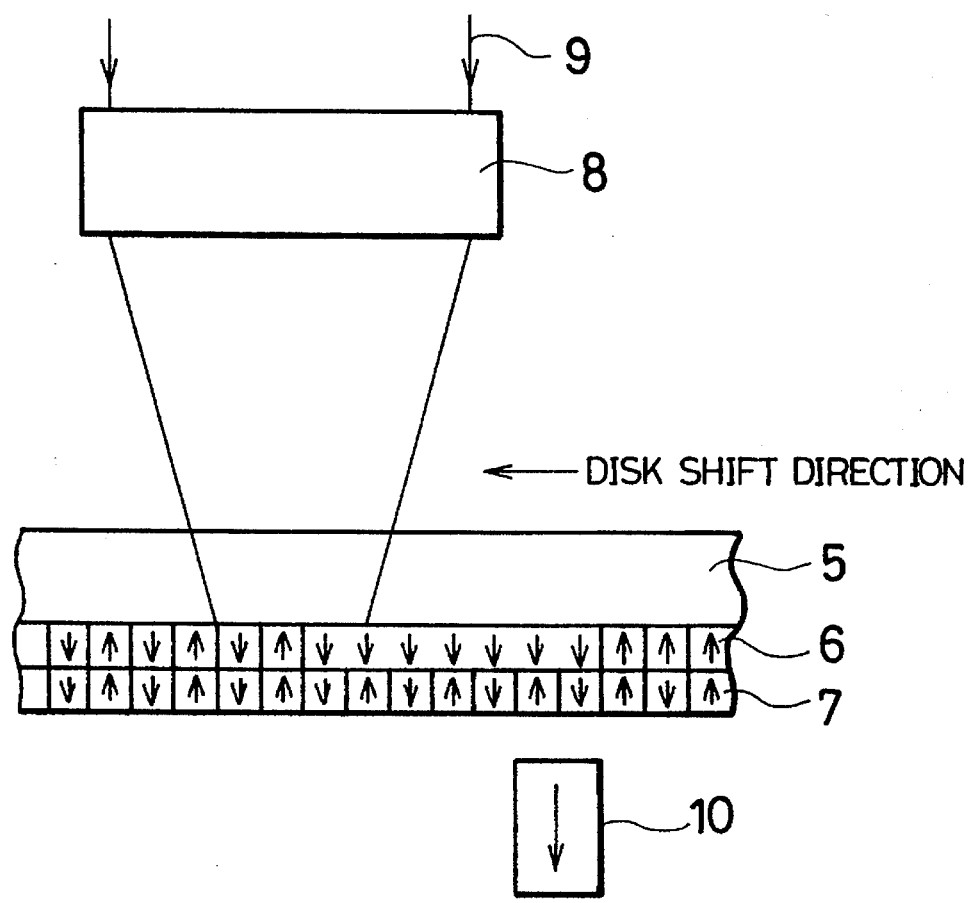
FIG. 6 shows a prior art arrangement, and is an explanatory drawing that indicates a reproducing operation on a magneto-optical disk.

Referring to FIG. 5, the following description will discuss another example of the magneto-optical disk (magneto-optical recording medium) wherein a reflective film is added onto the recording-reproduction layer. Here, those members that have the same functions and that are described in the foregoing embodiment are indicated by the same reference numerals and the description thereof is omitted.

As shown in FIG. 5, a magneto-optical disk (magneto-optical recording medium) of the present embodiment is constituted of a recording-reproduction layer of a three-layer structure including a substrate 1, one transparent dielectric film 2a, a magnetic layer 3 and a transparent dielectric film 2b, as well as a reflective film 4, all of which are laminated in this order. In this magneto-optical disk, only one magnetic layer 3 as a recording-reproduction layer is required; therefore, by making the magnetic layer 3 not more than 30 nm (20 nm in this embodiment) in thickness, a four-layer structure including the reflective layer 4 which has been used in prior art magneto-optical disks, is adopted.

In the above arrangement, during reproduction, a reproduction-use light beam (not shown) is projected onto the magnetic layer 3 from the side of the substrate 1. At this time, a light beam, which is a part of the incident reproduction-use light beam that has been transmitted through the magnetic layer 3 and the transparent dielectric film 2b, is reflected off from the reflective film 4. With this arrangement, the temperature of the magnetic layer 3 is raised by the irradiation of the reproduction-use light beam through the dielectric film 2a as well as by the irradiation of the light beam that has been reflected off from the reflective film 4. Then, as with the aforementioned magneto-optical disk of the three-layer structure, the transition from the in-plane magnetization characteristic to the perpendicular magnetization characteristic occurs at a recorded bit located at the portion being subjected to the temperature rise by those light beams, and information recorded in the magnetic layer 3 is reproduced by reflected light from the recorded bit having the magneto-optical Kerr effect.

In this arrangement, by adopting the magneto-optical disk of the four-layer structure, the light beam reflected off from the reflective film 4 emphasizes the magneto-optical effect, and thus provides a greater magnetic Kerr rotation angle; thus, the intensity of the reproduced signal can be increased. As a result, this magneto-optical disk makes it possible to reproduce information with high accuracy and enhance the quality of reproduced information.

Additionally, in these embodiments, explanations are given of a magneto-optical disk as one example of a magneto-optical medium; yet, the present invention is not limited to the magneto-optical disk, but adoptable to, for example, such a medium as a magneto-optical tape and a magneto-optical card.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a substrate;

a dielectric layer directly over said substrate;

a magnetic layer directly over said dielectric layer, recording bits of information as localized areas having magnetization direction components differing from surrounding portions of said magnetic layer, said magnetic layer being the only magnetic layer included in said medium, and said magnetic layer consisting of a rare-earth/transition metal alloy having a composition containing a higher percentage of rare-earth metal, as compared to the percentage of rare-earth metal in a compensating composition in which magnetic moments of the rare-earth metal and the transition metal balance each other at room temperature, which exhibits, at room temperature, an in-plane magnetization, for magnetization components not corresponding to recorded information, and perpendicular magnetization, for magnetization components corresponding to recorded information, and which exhibits, at temperatures above a transition temperature exceeding room temperature, perpendicular magnetization corresponding to the recorded information for all magnetization components;

and a second dielectric layer directly over said magnetic layer.

2. The medium of claim 1 wherein a reflecting layer is provided over said second dielectric layer.

3. The medium of claim 1 wherein said alloy is GdFeCo.

4. The medium of claim 1 wherein said alloy is TbFeCo.

5. The medium of claim 1 wherein said alloy is DyFeCo.

6. The medium of claim 1 wherein said medium is a disk.

7. The medium of claim 1 wherein said medium is a tape.

8. The medium of claim 1 wherein said medium is a card.

\* \* \* \* \*